United States Patent [19]

Crow

[11] Patent Number: 5,554,694
[45] Date of Patent: Sep. 10, 1996

[54] PERFORMANCE ENHANCING ATHLETIC SHOE COMPONENTS AND METHODS

[76] Inventor: William R. Crow, 21300 Rim Rd., Perris, Calif. 92570

[21] Appl. No.: 409,023

[22] Filed: Mar. 23, 1995

Related U.S. Application Data

[63] Continuation-in-part of Ser. No. 45,831, Apr. 8, 1993, abandoned, which is a continuation-in-part of Ser. No. 10,727, Jan. 29, 1993, abandoned, which is a continuation of Ser. No. 744,196, Aug. 12, 1991, abandoned, which is a continuation-in-part of Ser. No. 718,082, Jun. 19, 1991, abandoned, which is a continuation-in-part of Ser. No. 632,762, Dec. 21, 1990, abandoned.

[51] Int. Cl.$^6$ ............................. C08L 7/00; C08L 9/00; A43B 13/38; A43B 1/10
[52] U.S. Cl. .................... 525/236; 525/237; 525/233; 525/194; 525/195; 521/140; 36/44; 36/43
[58] Field of Search ............................. 525/236, 237, 525/233; 521/140; 36/44, 43

[56] References Cited

U.S. PATENT DOCUMENTS

| | | | |
|---|---|---|---|
| 3,060,989 | 10/1962 | Railsback | 526/340.4 |
| 3,087,262 | 4/1963 | Russell | 36/28 |
| 3,589,036 | 6/1971 | Hendricks | 36/2.5 |
| 3,696,062 | 10/1972 | Lesage et al. | 260/5 |
| 3,724,107 | 4/1973 | Makinen | 36/7.3 |
| 4,006,542 | 2/1977 | Larson | 525/236 |
| 4,049,595 | 9/1977 | Dominguez | 260/5 |
| 4,119,588 | 10/1978 | Carpino | 260/5 |
| 4,219,945 | 9/1980 | Rudy | 36/29 |
| 4,253,252 | 3/1981 | Eisenberg | 36/120 |
| 4,366,630 | 1/1983 | Bloom | 36/30 R |
| 4,418,483 | 12/1983 | Fujita et al. | 36/28 |
| 4,502,234 | 3/1985 | Schaefer | 36/28 |
| 4,510,699 | 4/1985 | Nakamura et al. | 36/43 |
| 4,672,754 | 6/1987 | Ehrlich | 36/85 |
| 4,674,204 | 6/1987 | Sullivan et al. | 36/44 |
| 4,843,735 | 7/1989 | Nakanishi | 36/28 |
| 4,887,367 | 12/1989 | MacKness | 36/28 |
| 4,894,933 | 1/1990 | Tankel | 36/28 |
| 4,904,725 | 2/1990 | Himes | 524/505 |
| 4,910,886 | 3/1990 | Sullivan et al. | 36/44 |
| 4,918,841 | 4/1990 | Turner | 36/114 |
| 4,956,405 | 9/1990 | Wheeler | 524/100 |
| 4,970,807 | 11/1990 | Anderie | 36/28 |
| 4,972,611 | 11/1990 | Swartz | 36/28 |
| 5,038,500 | 8/1991 | Nicholson | 36/59 C |
| 5,053,438 | 10/1991 | Kozma | 521/134 |
| 5,084,987 | 2/1992 | Flemming | 36/28 |
| 5,147,589 | 9/1992 | Chang et al. | 264/45.1 |
| 5,185,203 | 2/1993 | Itaba et al. | 428/349 |
| 5,203,793 | 4/1993 | Lyden | 36/43 |
| 5,288,446 | 2/1994 | Noyama et al. | 264/108 |
| 5,304,326 | 4/1994 | Goto et al. | 252/511 |
| 5,362,435 | 11/1994 | Volpe | 264/248 |

FOREIGN PATENT DOCUMENTS

| | | |
|---|---|---|
| 57-025340 | 10/1982 | Japan. |
| 774351 | 5/1957 | United Kingdom. |
| 928648 | 6/1963 | United Kingdom. |

OTHER PUBLICATIONS

Firestone Literature on Diene 600, 635, 645 and 660 4 pages.
Firestone Literature on Diene SSAC.
Firestone literature on Diene Rubber in Extrusion Grade Impact Polystyrene.
Firestone literature on Diene Rubber for Impact Modification of Plastics.
Firestone literature on Storage and Handling of Plastic Grade Diene Polybutodiene Rubber.

*Primary Examiner*—Carman J. Seccuro, Jr.
*Attorney, Agent, or Firm*—Mark G. Sandbaken; Daniel P. McCarthy

[57] ABSTRACT

Performance enhancing shoe components, and methods of making the same, comprising 1,4-polybutadiene and a rubber selected from the group consisting of natural rubber, synthetic isoprene rubber, polyisoprene, butadiene acrylonitrile rubber and ethylenepropylene diene modified rubber. The shoe components may be formed as shoe midsoles and parts of midsoles, shoe soles and parts of soles, shoe insoles and parts of insoles, and shoe inserts.

13 Claims, 6 Drawing Sheets

PERFORMANCE ENHANCING ATHLETIC SHOE COMPONENTS AND METHODS

CONTINUITY

This application is a continuation-in-part of U.S. patent application Ser. No. 08/045,831, filed Apr. 8, 1993, now abandoned which is a continuation-in-part U.S. patent application Ser. No. 08/010,727, filed Jan. 29, 1993, now abandoned which is a continuation of U.S. patent application Ser. No. 07/744,196, filed Aug. 12, 1991, now abandoned, which is a continuation-in-part of U.S. patent application Ser. No. 07/718,082, filed Jun. 19, 1991, now abandoned, which is a continuation-in-part of U.S. patent application Ser. No. 07/632/762, filed Dec. 21, 1990, now abandoned.

I. BACKGROUND OF THE INVENTION

A. Field of Invention

The invention relates to the field of performance enhancing shoe components and methods for making the same. More specifically, this invention relates to the field of performance enhancing shoe components which provide energy return, and methods of making the same.

B. Description of the Related Art

The field of athletic shoe manufacturing and sales has become highly competitive in recent years. Various features have been included in shoes for promotional reasons or for comfort. Most improvements in athletic shoes have been made in the physical and structural make-up of the interior and exterior elements of soles of athletic shoes to improve the comfort and appearance of the shoes. While it has long been desired to provide athletic shoes which provide meaningful increases in athletic performance, few, if any, proposals for changes in athletic shoes have produced measurable improvements in performance. Often an improvement in athletic shoe performance is sought but is not attained because the design of the resulting shoe becomes a compromise between comfort and cost.

There is a high demand for athletic equipment which enhances the performance of athletes. As athletic events become more competitive, small improvements in performance become increasingly important. Athletic equipment which enhances the performance of athletes by only a few tenth or hundredths of a second, or a fraction of a centimeter, may provide the "winning edge" sought by many athletes. For this reason, athletes are constantly seeking equipment which will improve their performance. The designs of all types of equipment from bicycles to tennis rackets are constantly scrutinized for features which may improve performance. For example, racing bicycles have been radically redesigned to improve performance while reducing weight and friction. Cycling helmets have also been redesigned to reduce weight and air friction.

This high demand for performance enhancing athletic equipment includes the art of athletic shoes and shoe components. Prior to the present invention, few shoe components have been made available which confer a significant enhancement in athletic performance by providing energy return. No prior shoe feature provides substantial energy return to the user. Similarly, no prior shoe component feature provides energy return in the form of lift, spring or bounce.

The material most frequently used for insoles in athletic shoes is ethylene vinyl acetate ("EVA"). EVA is a lightweight, inexpensive, sponge-like material which does not provide significant energy return. Examples of shoe insoles made from EVA are disclosed in U.S. Pat. No. 4,418,483, which is incorporated herein by reference. This patent teaches making shoe midsoles by combining EVA with a styrene-butadiene rubber. While such midsoles have excellent cushioning properties, they do not enhance the athletic performance by providing energy return to the user. Rather, the cushioning effect of the EVA material can reduce athletic performance by absorbing energy.

U.S. Pat. No. 4,418,483 also discloses combining 1,4-polybutadiene with other rubbers, such a 1,2-polybutadiene, to make hard shoe outsoles or shoe midsoles. These other rubbers do not provide substantial energy return, and reduce the energy return characteristics of the 1,4-polybutadiene. For example, in its cured state, 1,2-polybutadiene is a hard material which lacks the ability to be compressed and rebound to provide energy return. In its uncured state, 1,2-polybutadiene (syndiotactic) may exhibit mild elastomeric properties. When high energy return rubbers such as 1,4-polybutadiene rubber are combined with 1,2-polybutadiene, the 1,2-polybutadiene typically controls the characteristics of the resulting composition and reduces the energy return of the 1,4-polybutadiene.

U.S. Pat. No. 5,147,589, which is incorporated herein by reference, discloses making shoe soles of a polymer blend which is a mixture of rubbers including thermoplastic elastomers, styrene-butadiene rubber, acrylonitrile-butadiene rubber, and plastics such as polystyrene, EVA, or polyvinyl chloride. When high energy return rubbers such as 1,4-polybutadiene rubber are incorporated into such shoe soles, the high energy rubbers also comprise a small weight percentage of the total rubber in the shoe, and, therefore, the shoes do not provide substantial energy return.

While the energy return of 1,4-polybutadiene, in the form of super balls, for example, is known, those of ordinary skill in the shoe art have not looked to 1,4-polybutadiene as a material for shoe components by which athletic performance could be substantially enhanced. In particular, the makers of athletic shoes have failed to appreciate the significant energy return available from shoe components comprising 1,4-polybutadiene in combination with natural rubber, synthetic isoprene rubber, polyisoprene, butadiene acrylonitrile rubber or ethylenepropylene diene modified rubber. This is due in part to the fact that 1,4-polybutadiene in its cured skate has a cheesy texture, and crumbles and tears readily due to a lack of tensile strength. The present invention provides ways by which 1,4-polybutadiene can be cross-linked with other rubbers to manufacture cross-linked compositions which significantly enhance athletic performance when placed within a shoe and which possess both durability and tensile strength, a result which would not be expected given the teachings of the prior art.

II. SUMMARY OF THE INVENTION

It is an object of the present invention to provide novel shoe components for athletic shoes which significantly improve an athlete's ability to leap forward, jump upward, and run faster. It is a feature of the invention that the shoe components can provide an improvement in athletic performance. It is an advantage of the invention that the shoe components can improve athletic performance in a variety of athletic events.

It is an object of the invention to provide a variety of shoe components which improve athletic performance. It is a feature of the invention that the shoe components may comprise a sole, a sole portion, an insole, an insole portion or an insert which possesses significant energy return characteristics. It is an advantage of the invention that the shoe components may be designed to fit a variety of athletic shoes and may be positioned within the sole, the insole, or on top of the sole or insole. It is a further advantage of the invention that the shoe components are light-weight.

It is an object of the invention to provide shoe components which increase an athlete's stride length. It is a feature of the invention that the shoe components can increase stride length. It is an advantage of the invention that longer stride lengths can help athletes run faster and jump higher. It is a further advantage of the invention that the shoe components can also reduce leg fatigue.

It is an object of the invention to provide shoe components that provide shock absorption as well as energy return. It is a feature of the invention that the shoe component provides cushioning as well as energy return. It is an advantage of the invention that the shoe component provides comfort as well as energy return. It is a further advantage of the invention that the shoe components provide cushioning, comfort and energy return to athletes as well as non-athletes.

It is an object of the invention to provide a shoe component that can be used by injured athletes. It is a feature of the invention that the shoe components provide cushioning and shock absorption to prevent athletic injuries. It is an advantage of the invention that the shoe components can be used to prevent injuries and to rehabilitate athletes with injuries such as shin splints.

These and other objects, features and advantages of the invention will be clear to a person of ordinary skill in the art upon reading this specification in light of the appending drawings.

III. BRIEF DESCRIPTION OF THE DRAWINGS

IV. DETAILED DESCRIPTION OF THE PREFERRED EMBODIMENTS

Figure 1:
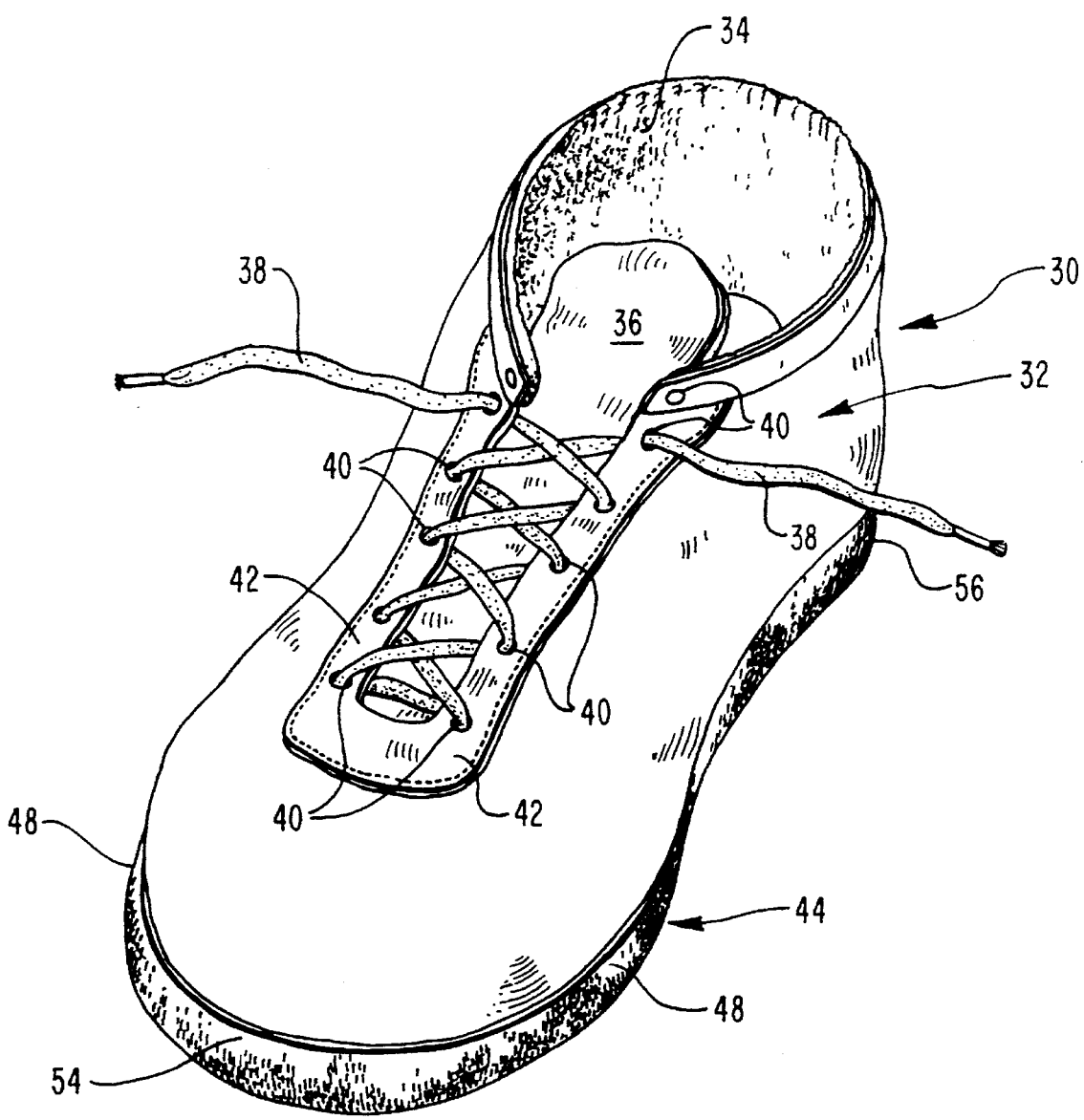
FIG. 1 is a perspective representation of an athletic shoe having an internal sole portion comprising one embodiment of the present invention.

The invented performance enhancing shoe components may comprise a sole, a portion of a sole, an insole, a portion of an insole, or a shoe insert. As used herein, the term "performance enhancing" means that the device, when used, permits the wearer to jump higher, leap farther, run faster, take longer strides, etc. The invented shoe components comprise a mixture of a 1,4-polybutadiene and a rubber. As used herein, the term "1,4-polybutadiene" is defined to be a 1,4-polybutadiene having a cis content of at least about 90%. In the preferred embodiment of the invention, the 1,4-polybutadiene has a cis content of at least about 90%. More preferably, the invention comprises a 1,4-polybutadiene that has a cis content of at least about 95%, which is referred to hereafter as "high-cis 1,4-polybutadiene."

When making the invented shoe component, the 1,4-polybutadiene is combined with a rubber selected from the group consisting of natural rubber, synthetic isoprene rubber, polyisoprene, butadiene acrylonitrile rubber and ethylenepropylene diene modified rubber. These rubbers provide substantial energy return in combination with the 1,4-polybutadiene. In a preferred embodiment of the invention, the 1,4-polybutadiene is cross-linked with natural rubber, synthetic isoprene or polyisoprene. In the most preferred embodiment of the invention, the 1,4-polybutadiene is cross-linked with natural rubber. Such a rubber may include standard Malaysian rubber, Grade 5.

Methods of determining the cis content of and preparing 1,4-polybutadiene having a cis content of at least about 90%, and of making cured mixes of 1,4-polybutadiene with other rubbers are well known to those of ordinary skill in the art, and are disclosed in the *Kirk-Othmer Encyclopedia of Chemical Technology* (4th Edition), which is incorporated herein by reference.

Typically, the 1,4-polybutadiene/rubber blends used in the invention will be characterized by a 1,4-polybutadiene weight percent within the range of about 46 to about 95 weight percent and a rubber weight percent of about 54 to about 5 weight percent, based on the total weight of the 1,4-polybutadiene and the rubber. In the preferred embodiment of the invention, the amount of 1,4-polybutadiene may range from about 50 to about 75 weight percent, and the rubber may range from about 50 to about 25 weight percent. In a more preferred embodiment of the invention, the amount of 1,4-polybutadiene may range from about 54 to about 65 weight percent, and the amount of rubber may range from about 46 to about 35 weight percent. In the most preferred embodiment of the invention, the composition comprises about 60 weight percent 1,4-polybutadiene and about 40 weight percent rubber.

Examples of embodiments of the present invention will include those presented in Table 1. These embodiments will include blends of 1,4-polybutadiene with high energy return rubbers such as natural rubber, synthetic isoprene rubber, polyisoprene, butadiene acrylonitrile rubber and ethylene-propylene diene modified rubber. As the percentage of the 1,4-polybutadiene increases with respect to the rubber, energy return increases and durability and tensile strength decrease.

Referring to Table 1, a substantially solid shoe sole may comprise about 46 weight percent 1,4-polybutadiene and about 54 weight percent polyisoprene, which will provide durability and energy return. A foam insole (Example 2) may comprise equal parts of 1,4-polybutadiene and butadiene acrylonitrile rubber. Such a shoe insole may be used by wearers seeking a comfortable insole which provides energy return. Shoe midsoles and insoles which will provide enhanced energy return as a result of a cured mix comprising high-cis 1,4-polybutadiene and a rubber are shown in Examples 3, 5, 7, 9 and 10. A foam insole providing enhanced energy return (Example 4) will also include about 75 weight percent 1,4-polybutadiene and about 25 weight percent synthetic isoprene. In some embodiments of the invention, the shoe component may comprise a foam midsole with about 95 weight percent 1,4-polybutadiene and about 5 weight percent of a rubber such as natural rubber (Example 6). In a preferred embodiment of the invention (Example 8), the invention may comprise a substantially solid insole of about 60 weight percent 1,4-polybutadiene and about 40 weight percent natural rubber.

In some preferred embodiments: of the invention, the 1,4-polybutadiene may contains other materials such as stabilizing agents. Such a 1,4-polybutadiene may include FIRESTONE DIENE 55NFA or FIRESTONE DIENE 55AC10, which typically have a cis content of about 90%. Alternately, the invention may comprise a high-cis 1,4-polybutadiene such as FIRESTONE DIENE 600, 635, 645 or 660, which have a typical analysis of about 95% cis content.

The 1,4-polybutadiene is combined with a rubber selected from the group consisting of natural rubber, synthetic isoprene rubber, polyisoprene, butadiene acrylonitrile rubber and ethylenepropylene diene modified rubber to form a pre-mix. The pre-mix is then cross-linked to form a cured mix, hereafter referred to as a "1,4-polybutadiene/rubber composition." To accomplish this, well known additives are introduced into the pre-mix. Specifically, activating, accelerating, and curing agents are introduced as part of the pre-mix, as will be discussed in more detail below.

In one preferred embodiment of the invention, a foaming agent (blowing agent) may be included in the pre-mix to form a foam composition containing entrapped gas. The type and use of such foaming agents are readily known to those of ordinary skill in the art. The amount of foaming agent may include any effective amount of foaming agent sufficient to form a foam 1,4-polybutadiene/rubber composition. Such a range may include about 0.1 to at least 20 weight percent, based on the weight of 1,4-polybutadiene and rubber. In another preferred embodiment of the invention, the cured mixture may be substantially solid and free of trapped gas by omitting a foaming agent from the pre-mix. Agents such as activation, acceleration and curative agents may be used in the preparation of either the foam or substantially solid 1,4-polybutadiene/rubber composition.

In some preferred embodiments of the invention, other materials may be included in the shoe component to provide additional features including, but not limited to, color, textures, added structural integrity and wear resistance. In some preferred embodiments of the invention, the invention is substantially free of fillers which reduce the energy return of the shoe component.

The 1,4-polybutadiene/rubber composition forms a layer within a shoe. The thickness of the layer may range from about $\frac{1}{16}$" to about $\frac{1}{2}$". In the preferred embodiment of the invention, the thickness of the layer may range from about $\frac{1}{16}$" to about $\frac{1}{4}$". In the most preferred embodiment of the invention, the thickness of the layer is about $\frac{5}{64}$". To achieve the highest energy return, it is important to nearly or completely compress the 1,4-polybutadiene/rubber composition and then to allow the composition to expand or rebound to its original thickness. Therefore, the thickness of the shoe component may also be varied according to the weight and strength of the user.

The energy return available from the shoe component may be enhanced by adding a thin layer or coating of a hard material to the top and/or bottom surface of the 1,4-polybutadiene/rubber composition, hereafter referred to as a "coating". In the preferred embodiment of the invention, a hard polyurethane coating is used. The coating thickness may range from about $\frac{1}{64}$" to about $\frac{1}{16}$". In the most preferred embodiment of the invention, the coating thickness is about $\frac{1}{64}$". The coating thickness may be varied according to the desired use of the shoe component.

Reference is now made to the drawings wherein like numerals are used to designate like parts throughout and which illustrate various forms and embodiments of the present invention, as are currently preferred.

FIG. 1 illustrates a typical athletic shoe, generally designated 30, which is intended to exemplify any conventional shoe (athletic or otherwise) equipped with a shoe sole embodiment of the present invention. Shoe 30 comprises a conventional upper portion, generally designated 32, which comprises a foot-receiving interior 34, a tongue 36, laces 38, and lace-receiving apertures 40 disposed in opposed, spaced, reinforced bands 42 located at the arch of the shoe.

Shoe 30 also comprises a sole, generally designated 44. Sole 44 is connected to upper shoe portion 32 at lap interface 46 in any desired conventional Way, such as by heat fusion, adhesive bonding and/or stitching.

Sole 44 is illustrated as comprising vertical side surfaces 48 and a bottom tread surface 50. The sole 44 is illustrated as spanning from the toe 54 to the heel 56 of the shoe and is configurated along side surfaces 48.

Figure 2:
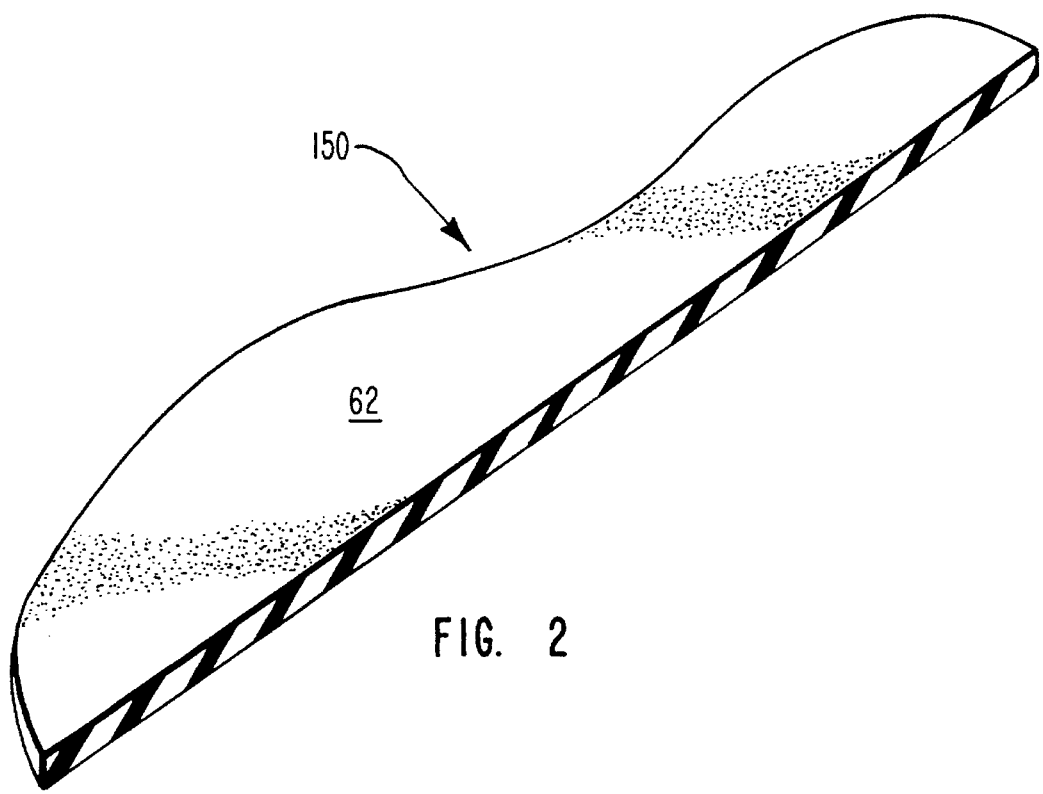
FIG. 2 is an enlarged fragmentary perspective shown partly in cross-section of an insole of the present invention.

Referring to FIG. 2, the shoe 30 may internally comprise a conventional insole, generally designated 150, which runs the full length of the shoe and is configurated as is the shoe. The insole 150 is illustrated as being of uniform thickness throughout its entire length and comprises a top surface 62 and a bottom surface 64. The insole 150 may also form part of an insole to be positioned at any desired location, such as at the ball region, the heel region or the arch region, for example. Any of the 1,4-polybutadiene/rubber compositions described earlier may comprise the material forming insole 150.

Figure 5:
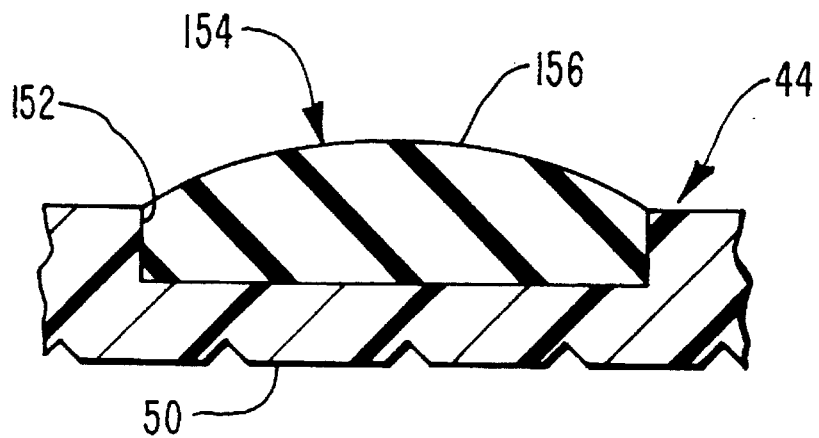
FIG. 5 is an enlarged fragmentary cross-section of still a further embodiment in accordance with the present invention with a sole element inserted into a cavity in the sole.

In reference to FIG. 5, it is to be appreciated that sole inserts also fall within the scope of the present invention. Specifically, the tread portion 44' of athletic shoe 30 is illustrated in FIG. 5 as having a rectangular recess 152 disposed at the upper surface thereof. A sole insert 154 comprising a 1,4-polybutadiene/rubber composition is illustrated as having been placed into the recess 152 so that the edges thereof are flush with the top surface of the tread portion 44 while the arched center 156 of the sole insert protrudes above the tread portion. Other configurations could be used such as a flat or convex sole segment or insert 154. The sole insert 154 can be disposed interior of the shoe at any desired location, such as at the ball region, the heel region or the arch region, for example.

Furthermore, either in a localized or comprehensive way, embodiments wherein a portion thereof is within a shoe at the sole region thereof and/or a portion is exposed exterior of the shoe are also within the scope of the present invention.

Figure 3:
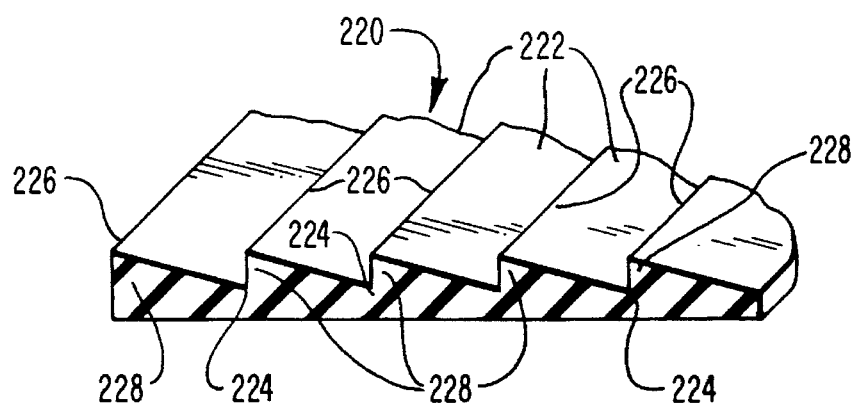
FIG. 3 is a fragmentary partial perspective shown partly in cross-section of a further embodiment of the present invention.
Figure 4:
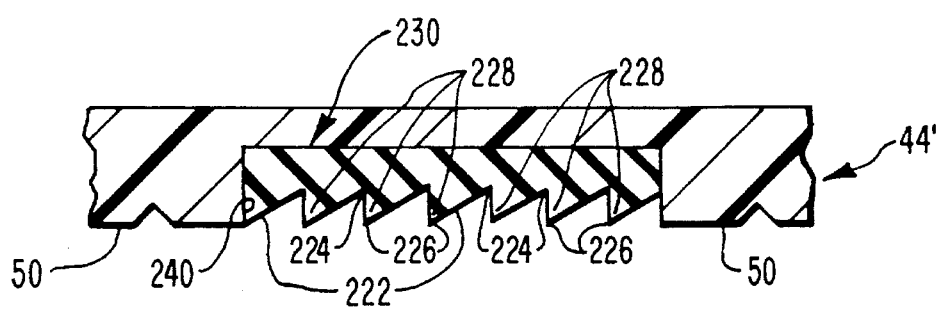
FIG. 4 is an enlarged fragmentary cross-section of another embodiment of the invention with a sole portion having treads.
Figure 6:
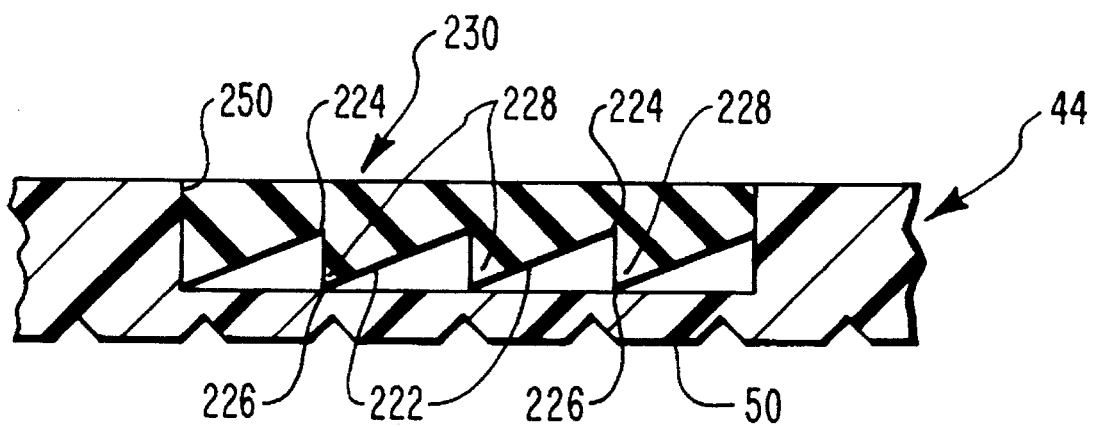
FIG. 6 is an enlarged fragmentary cross-section of still another embodiment of this invention.

Reference is now made to FIGS. 3, 4 and 6 which illustrate serrated sole segments or inserts in accordance with the present invention wherein the serrations are constructed so as to accommodate deflection during use. Specifically, the sole segment, generally designated 220 in FIG. 3, is formed of any one of the above-described 1,4-polybutadiene/rubber compositions and comprises a heel segment which may be used as part of the sole of the shoe either internally or externally. Sole segment 220 comprises a serrated or tooth surface 222. Serrated surface 222 comprises lines 224 of minimum thickness and lines 226 of maximum thickness. Between and somewhat offset from each adjacent lines 224 and 226 are hinge or pivot sites 228. Thus, when the user places force and/or weight upon the sole segment 220, the force is applied first at lines 226 causing those lines to rotate about their respective hinge sites 228 into a somewhat folded configuration. As the force is removed by the user, the distorted lines 226, due to the memory of the 1,4-polybutadiene/rubber composition, from which sole segment 220 is formed, extend vertically and pivotally back toward their initial position adding energy return to that which is imparted by the user.

Similarly, the previously-described sole 44 of the shoe 30 may be equipped with an external recess 240, shown in FIG. 4 to be essentially rectangle in configuration. The recess 240 may be located any place along the exterior of the shoe portion 44 so as to be exposed at the tread surface 50. A serrated insert, generally designated 230, is illustrated as being inserted into and retained within recess 240. Sole insert 230 is illustrated as being formed of a 1,4-polybutadiene/rubber composition of the types described above and, while rectangular in shape so as to contiguously fit within the recess 240, has an exposed serrated configuration as described in conjunction with FIG. 3, i.e., a serrated surface 222, lines 224 and 226 and hinge points 228. The insert 230 is preferably secured within the recess 240 by a suitable adhesive or by heat fusion, if desired. It is presently preferred that the external insert 230 be secured within the recess 240 in such a way that it can be physically removed when it is worn and replaced by a new insert. The exterior of the sole insert 230 may be coated with a wear and corrosion-resistant substance or the material from which the insert 230 is made may comprise conventional wear and corrosion-resistant constituents, such as sulfur, carbon and/or halogen.

In regard to FIG. 6, the sole 44 of the shoe 30 may be fashioned so as to comprise an internal recess 250. The described insert 230 may be installed within the recess 250 either with the serrations up or down, as desired, the serrations being illustrated as disposed in a downward direction in FIG. 6. The insert 230 is secured by heat fusion, adhesive material or in any other suitable way within the recess 250 and may be so secured so as to be removable and replaceable with a new sole segment in accordance with the principles of the present invention when and as desired. A spacer material, if desired, may be juxtaposed with the serrated surface 222, or not used at all, as illustrated in FIG. 6.

Figure 7:
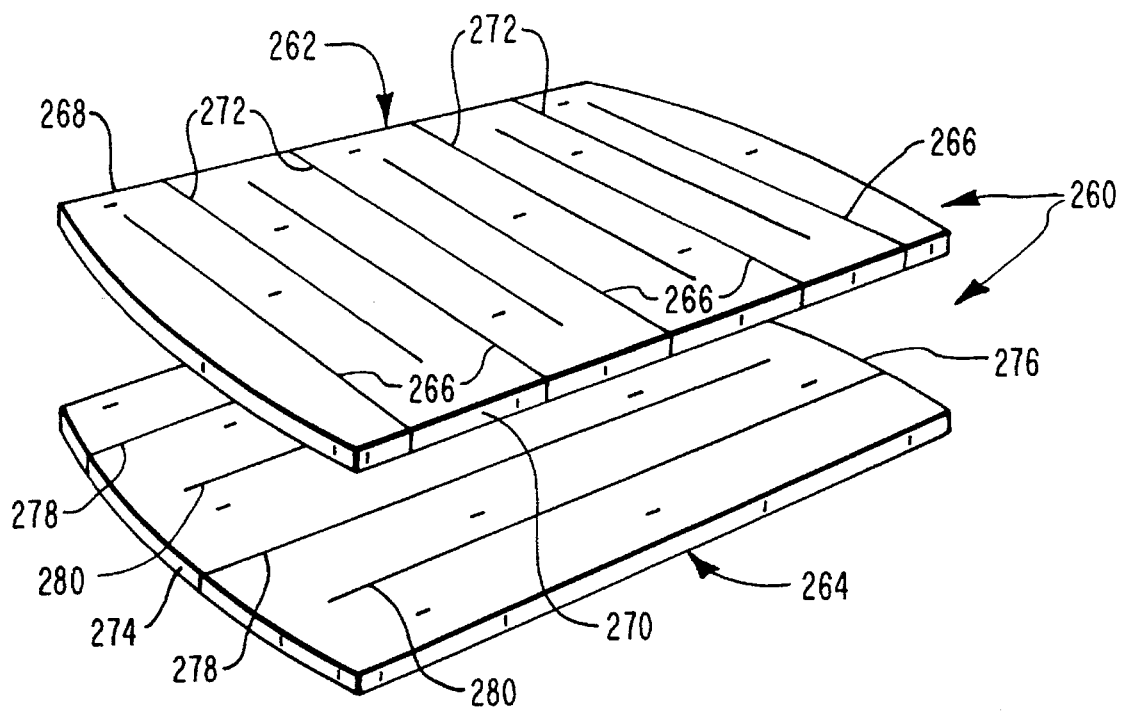
FIG. 7 is an exploded perspective of two separate, superimposed insole portions comprising slits for expansion under compression, which are adapted for placement within a shoe at either the ball, the heel or both.

Reference is now made to FIG. 7 which illustrates in exploded perspective a bi-layer insole portion, generally designated 260, fashioned in accordance with the principles of the present invention. The insole portion 260 comprises the top layer 262 and bottom layer 264, each comprising one of the abovedescribed 1,4-polybutadiene/rubber compositions in accordance with the principles of the present invention. In use, insole segment layers 262 and 264 are intended to be vertically superimposed and contiguous one with tire other and to be placed beneath either or both the ball or heel of a foot of a user within the interior of a shoe. The insole layers 262 and 264 may be placed either above an existing insole layer or within a recess internally disposed within the shoe having a suitable thickness to accommodate receipt of layers 262 and 264.

Layer 262 is illustrated as comprising longitudinally directed fingers cut in the material after it is formed and cured. These fingers, are formed by a plurality of alternate slits 266 which extend from a location slightly spaced from the front edge 268 to intersect the rear edge 270.

Similarly, at locations mid-distant between slits 266 are disposed additional longitudinally directed slits 272, which begin at a location slightly forward of the rear edge 270 and extend in a forwardly direction terminating at forward edge 268.

The slits 266 and 272 form a series of opposed rearwardly and forwardly extending fingers such that when subjected to weight and the force of walking or running under the ball or heel of the user's foot will accommodate yawning, spreading or separation of the fingers at the slits 266 and 272 to enhance energy return in a desired direction. Similarly, insole segment layer 264 comprises a blunt left side edge 274 and a blunt right side edge 276 (as viewed in FIG. 7). Transfer slits 278 extend from edge 274 to a location in each case spaced a short distance from edge 276. Similarly, transverse slits 280 extend entirely through the Layer 264 and run from edge 276 to a location spaced a short distance from edge 274.

Just as slits 266 and 272 in partial insole layer 262, yawn, spread or expand transversely to improve energy return, so too do slits 278 and 280 yawn, spread or expand under weight and force in a longitudinal direction to similarly improve energy return or rebound of the bi-layer insole segment 260.

Figure 8:
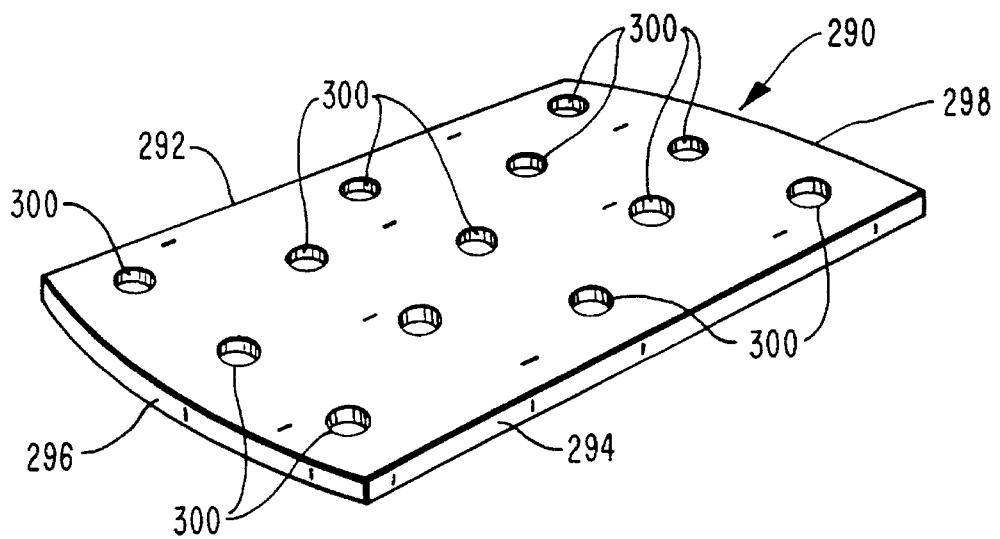
FIG. 8 is a perspective of an insole portion having breathing and yawning perforations, adapted for placement within a shoe at either the ball, the heel or both.

Reference is now made specifically to FIG. 8, which illustrates still another insole segment, generally designated 290, formed in accordance with the principles of the present invention. Insole segment 290 is illustrated as comprising front and back blunt edges 292 and 294 as well as curved left and right side edges 296 and 298, so that the insole segment 290 may be placed beneath the heel and/or ball of the foot of the user in a shoe for improved energy return in a desired direction, such as at an angle to both the horizontal and the vertical. The increase in energy return not only improves the distance one can jump, but adds an increment of quickness to each step or stride of the user.

The insole segment 290 comprises a plurality of perforations or apertures 300, which allows any shoe portion disposed below the insole segment 290 to breathe and which also provides room for the material comprising the insole segment 290 to expand or spread under the weight and force of the user during walking and running. By providing space in the form of perforations 300 for the flattening of the insert segment 290, the energy return is enhanced.

Figure 9:
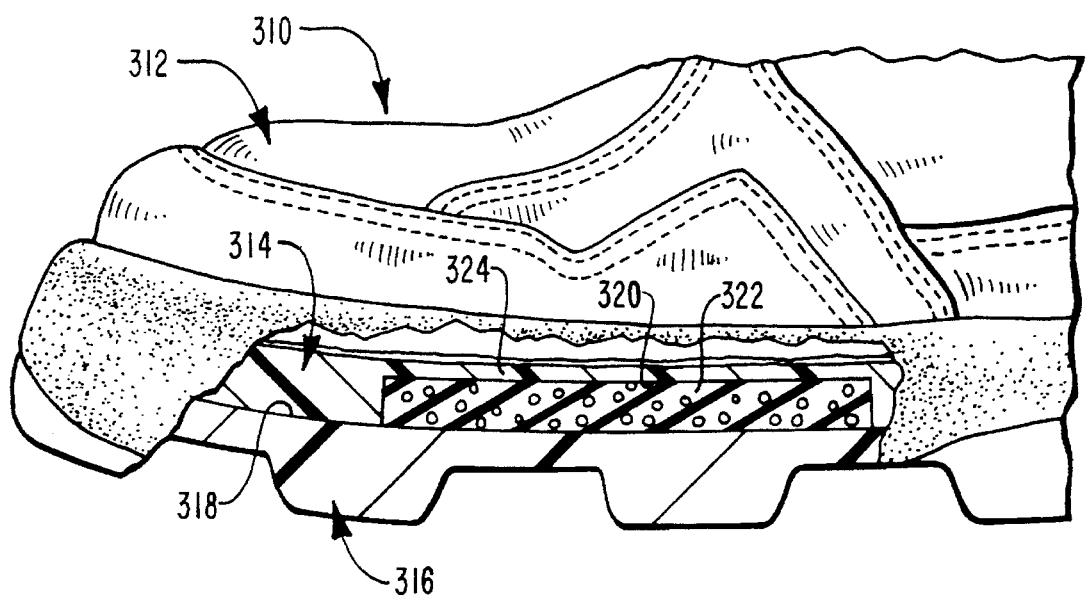
FIG. 9 is a fragmentary side elevation partly in cross-section showing a sole element within the insole region sandwiched between relatively rigid top and bottom layers.

Reference is now made to FIG. 9 which illustrates still a further embodiment, generally designated 310, of the present invention. The shoe embodiment 310 comprises a shoe upper 312, an interior insole 314, and a tread layer 316.

While shoe 310 and the components described above are intended to be representative of any shoe with the present invention may be associated, the configuration or arrangement of FIG. 9 is illustrative of principles pertaining to the present invention, which will becomes more apparent from the following description. Specifically, above the top surface 318 of the exposed tread layer 316, adjacent the ball receptacle of the shoe 312, is disposed a lower recess 320 in the midsole 314. A sole segment 322 is disposed with the recess 320 and is, therefore, spaced from the sock and shoe of the user. Segment 322 may be substantially rectangular in configuration and is illustrated as having a uniform thickness throughout. Segment 322 may also have any other suitable configuration according to the desired use and placement of the segment within the midsole. The segment 322 is illustrated as entirely filling the lower cavity 320 in the midsole layer 314. The segment 322 is illustrated as comprising one of the above-described foam 1,4-polybutadiene/rubber compositions, segment 322 could be formed of a substantially solid 1,4-polybutadiene/rubber composition.

The configuration illustrated in FIG. 9 is such that the midsole layer 314, and particularly that reduced thickness portion 324 of midsole 314 disposed immediately above the insole segment 322 is preferably relatively stiff and, therefore, tends to maintain its flat configuration and function as a bearing plate when the weight of the User and the force of the user's foot in walking and running are imposed thereon to compress the layer 322. When the exposed tread sole 316 is also relatively stiff and resistant to material indentation it functions also as a bearing plate whereby the layer 322 is compressed between two relatively stiff bearing plates. As the weight and force of the user's step or stride is lifted, it has been found that the energy return of the layer 322 against the foot of the user enhances stride and lift while the configuration of the layer 322 is illustrated in FIG. 9 as being limited to the ball of the foot of the user, it is to be appreciated that it could be extended beyond the ball of the foot and/or placed under the heel of the user or under both the ball and heel of the foot of the user.

Figure 10:
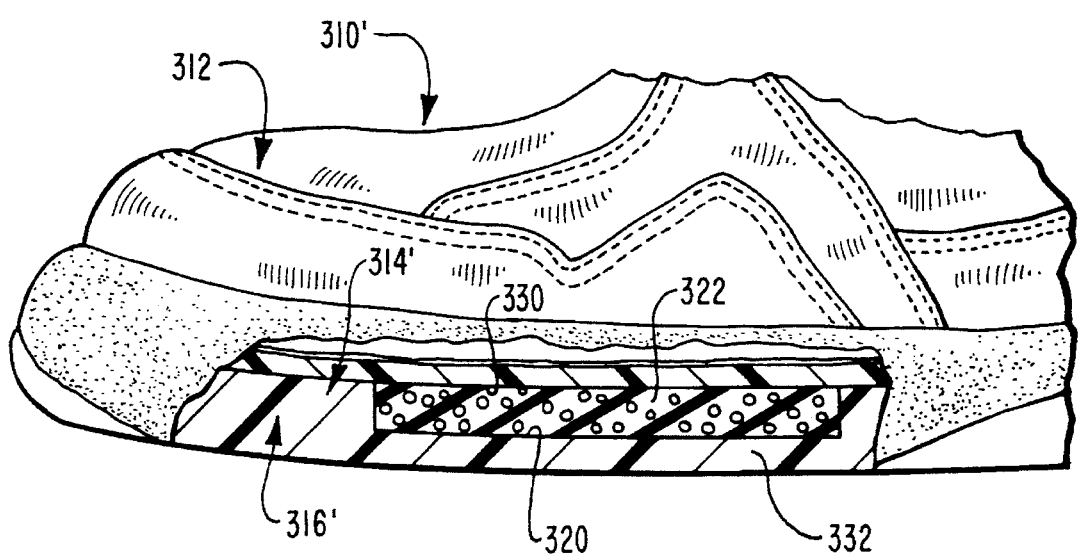
FIG. 10 is a fragmentary side elevation partly in cross-section similar to FIG. 9, but; with the insole disposed between relatively rigid top and bottom layers within the sole region substantially as close as reasonably possible to the exposed bottom tread surface of the shoe.

Reference is now made to FIG. 10 which illustrates an additional shoe embodiment, generally designated 310'. Shoe 310' comprises upper shoe portion 312, a relatively thin insole layer 314' and a sole 316'. The insole 314' is illustrated as being of uniform thickness throughout and without any recess or cavity disposed therein. In other preferred embodiments of the invention, the thickness of insole 314' could be varied according to the desired use and performance enhancement. The exposed sole 316' may comprise a generally rectangular shaped cavity 320' disposed between the bottom surface 330 of the insole 314'. The thickness of the cavity 320' is illustrated as being uniform and as slightly greater than one-half the depth of the sole 316' both forward and rearward of the cavity 320'. The thickness of 320' may also be varied according to the desired use and performance enhancement. The layer 322, described above in connection with FIG. 9 is illustrated as being disposed within cavity 320' and serves to function in the same fashion described above when interposed between a stiff plate-like insole 314' and a reduced thickness sole layer 322 so that the 1,4-polybutadiene/rubber composition of layer 322 is essentially sandwiched between two stiff plates. Thus, as force due to weight, walking and/or running is cyclically applied and removed by the foot of the user to the top plate, i.e., stiff insole 314', the layer 322 is compressed and recoils between layers 332 and 314'. Thus, when the force and weight are lifted by the user, the recoil effect of the layer 322 is imposed in a somewhat uniform way across the entire ball or other part of the foot and provides energy return.

Figure 11:
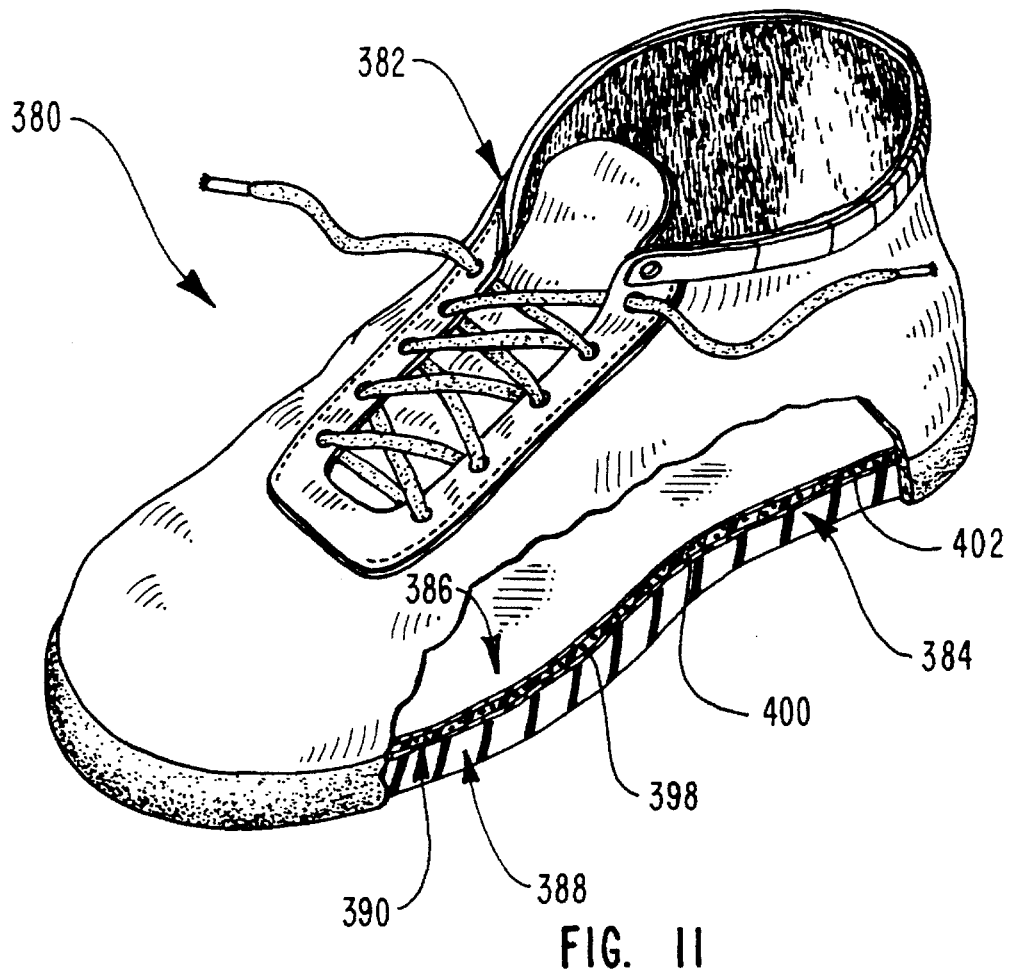
FIG. 11 is a fragmentary perspective of a shoe showing a high bounce lamination within an insole or mid-sole region of the shoe.
Figure 12:
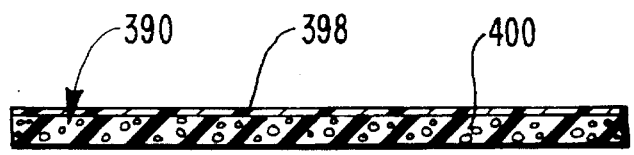
FIG. 12 is a section of one embodiment of the sole element taken across the shoe of FIG. 11 at the instep.

FIGS. 11 and 12 illustrate a shoe 380 comprising an upper portion 382, and a sole portion, generally designated 384.

Sole 384 comprises an inner sole or insole layer 390 and a bottom sole 388. Insole 390 comprises a lamination comprising two layers of foot supporting materials. The lamination comprises a top layer 398 and a bottom layer 400. Top layer 398 is preferably a thin hard film, and is tightly bonded to the top surface of the bottom layer 400, which may be applied as a thin layer using a roller and allowed to cure. Bottom layer 400 comprises the above-described 1,4-polybutadiene/rubber composition.

Figure 13:
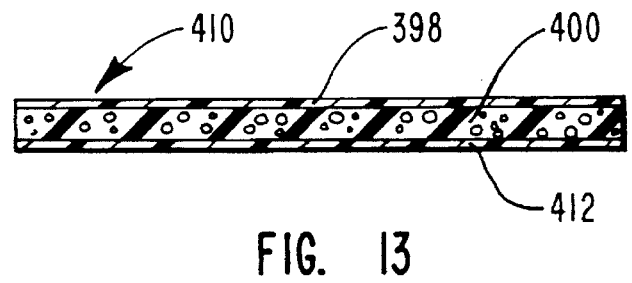
FIG. 13 is a cross-section of another embodiment of the sole element similar to FIG. 12.

In lieu of the insole 390, insole 410, shown in FIG. 13, may be used. Insole 410 is identical to insole 390, except a second, thin, rigid, hard layer 412 is disposed contiguously with the bottom surface of the intermediate layer 400. Layers 398 and may comprise the same materials or different materials. Layers 398 and 410 may have the same or different thicknesses.

The Methodology

The methodology by which the athletic performance-enhancing shoe components of this invention are formed is also significant. One preferred, substantially solid 1,4-polybutadiene/rubber compositions comprises by weight:

| | |
|---|---|
| Natural Rubber | 40.00 |
| 1,4-Polybutadiene (FIRESTONE DIENE 55NFA) | 60.00 |
| Zinc Oxide | 5.00 |
| Stearic Acid | 2.50 |
| 2,2'-Dithiobisbenzothiazole | 0.75 |
| Tetramethyl Thiuram Disulfide | 0.40 |

FIRESTONE DIENE 55AC10 (1,4-polybutadiene, 90% cis content) may also be used in this embodiment of the invention.

Another preferred 1,4-polybutadiene/rubber composition comprises by weight:

| | |
|---|---|
| Natural Rubber | 40.00 |
| High-Cis 1,4-Polybutadiene | 60.00 |
| Zinc Oxide | 5.00 |
| Stearic Acid | 2.50 |
| 2,2'-Dithiobisbenzothiazole | 0.75 |
| Tetramethyl Thiuram Disulfide | 0.40 |

The high-cis 1,4-polybutadiene may include FIRESTONE DIENE 600, 635, 645 or 660.

A preferred foam 1,4-polybutadiene/rubber composition comprises by weight:

| | |
|---|---|
| Natural Rubber | 40.00 |
| 1,4-Polybutadiene (FIRESTONE DIENE 55NFA) | 60.00 |
| Zinc Oxide | 5.00 |
| Stearic Acid | 2.50 |
| Sulfur | 2.00 |
| 2,2'-Dithiobisbenzothiazole | 0.75 |
| Tetramethyl Thiuram Disulfide | 0.40 |
| CELOGEN OT | 0.16 |

FIRESTONE DIENE 55AC10 (1,4-polybutadiene) may also be used in this embodiment of the invention.

Pre-Mixing

Since the several processes, by which products in accordance with the principles of the present invention are made, utilize the same or substantially similar pre-mix formulations, the pre-mixing phases will now be described.

The 1,4-polybutadiene, as a raw material, is commercially available in bales or blocks weighing approximately 70 pounds. The 1,4-polybutadiene is softened and masticated (churned or chewed up). Softening and mastication are best accomplished in a commercially-available Banbury mixer where the 1,4-polybutadiene is mixed with a rubber selected from the group consisting of natural rubber, synthetic isoprene rubber, polyisoprene, butadiene acrylonitrile rubber and ethylene-propylene diene modified rubber to provide durability and high tensile strength to the resulting material. The rubber, in an uncured state, is first placed in the Banbury mixer in solid form, e.g., in 3" solid strips. The 1,4-polybutadiene is then added to the Banbury mixer. For example, the 1,4-polybutadiene may be cut into 3" strips from one or more of the above-mentioned bales. The entire mixture is then cross-cut, chewed up, softened and mixed by the Banbury rollers. After the 1,4-polybutadiene and rubber are sufficiently-mixed, this pre-mixed composition has a putty-like consistency.

Cross-linking has been found to be a function of both elevated temperatures and pressure applied to the mix by which the compositions are cured. Cross-linking of the 1,4-polybutadiene and rubber of the pre-mix under high pressure and high temperature produces a durable, high energy return 1,4-polybutadiene/rubber composition having good tensile strength. To accomplish this within commercially acceptable times, certain commercially available and well known additives are introduced into the pre-mix described above. Specifically, commercially-available activating, accelerating, and curing agents are introduced as part of the pre-mix, in a collective amount usually not in excess of 10% by total weight of the 1,4-polybutadiene and the rubber. Preferably, a sulfur curing agent is acted upon by zinc oxide and stearic acid as activating agents. Examples of suitable accelerators may include, but are not limited to, tetramethyl thiuram disulfide, zinc dibutyldithiocarbamate and 2,2'-dithiobisbenzothiazole. The activators and accelerators become active in the process when heat, usually in excess of 300° F. for rapid curing, is applied.

Method No. 1

In the preferred method, the above-described pre-mix (including the curing, activating and accelerating agents) is removed from the Banbury mixer and placed as a layer of desired thickness, usually in excess of ¼, on a commercially-available cold mill.

This layered material is then fed from the cold mill into and through a commercially-available calendaring mill which has been preheated to 240° F. The calendared material is extruded from the calendar mill rollers at great pressure (e.g., 4,000 psi) to the desired thickness, e.g., ¹⁄₁₆" to ⅛". The material comes out of the calendaring mill as a continuous sheet having a predetermined width, e.g., 38", and is continuously wrapped around a storage roller onto cellophane and nylon stripping. The wrapping continues until a roll of suitable length has collected on the storage roller. The roll may be, for example, from ¹⁄₁₆" to ¼" thick, 38" wide, and from 40 to 200 feet long.

The roll is then taken to a pressure-applying autoclave and placed under heat (e.g., 307° F.) and pressure (e.g., 60 psi), for 4–5 hours to cure the roll. The heat and pressure cause the cellophane to contract around the roll. Afterwards the stripping is removed, and the cured high strength, high energy return material is re-rolled and placed in inventory.

Method No. 2

While this method is described in conjunction with the foam 1,4-polybutadiene/rubber composition, it is to be appreciated that, with the exception of a suitable gas entrainment additive, this method may be practiced to create either a foam or the substantially solid 1,4-polybutadiene/rubber composition.

If a foam 1,4-polybutadiene/rubber composition is desired, a suitable gas entrainment additive (foaming agent), such as 80% CELOGEN OT (generically referred to as p,p'-oxybisbenzene sulfonyl hydrazide, OBSH) (Uniroyal Chemical Company) or 800 GWP Master Mix (Master Processing, 2500 Thompson Street, Long Beach, Calif., 90801) is added to the pre-mix in amounts, for example, of 0.30 pounds per 188.8 pounds of premix or 11.0 pounds per 188.8 pounds of premix, respectively. The pre-mix is further mixed and layered to a desired pre-cured thickness in a cold mill. The desired pre-cured thickness will be slightly greater than the desired cured thickness, e.g., ⁵⁄₁₆" and ¼", respectively.

The sheet material obtained from the cold mill is cut into individual pieces sized to fit into a steel tray. An 18"×18" tray is satisfactory. The tray, carrying the sized material, is placed into a commercial hydraulic heat press and subjected to a continuing high temperature, e.g., within the range of 310°–320° F., under a uniformly applied press-imposed pressure, e.g., about 2000 psi, for about 20–30 minutes. The substantially solid 1,4-polybutadiene/rubber composition requires 10 minutes.

The fully cured tray-carried material is then removed from the heat press and placed in inventory, ready to be cut into shoe components.

Method No. 3

A commercial Rotocure (heated mills placed in series) is pre-heated, e.g., to about 310° F. The above-described pre-mix is fed into and through the Rotocure unit as a continuous layer or belt, where the heat (of about 310° F.) and the roller pressure (of about 4000 psi or more) are applied as the belt of pre-mix is displaced therethrough. A continuous sheet of cured material issues from the Rotocure for placement in inventory, ready to be cut into shoe components.

Alternatives

In lieu of a Banbury mixer, the pre-mix can be mixed on a mill. A Banbury mixer, however, is much quicker (5 to 10 minutes vs. 30 minutes) and is consequently much less expensive. Temperature and pressure may be varied to cure the materials of this invention to provide a high energy return 1,4-polybutadiene/rubber composition, depending upon time constraints.

While the foam and substantially solid 1,4-polybutadiene/rubber compositions described above have been correlated to shoe components, it is to be appreciated that these materials have application to other areas, such as gymnastics and basketball floors, and artificial football fields.

Energy Return

The energy return of the 1,4-polybutadiene/rubber composition is measured for Bashore Resilience by vertical rebound (ASTM D2632) using a button of the test material. As shown in Table 2, comparative testing of EVA insoles (Comparative Example 1) produced a 12% energy return. When a layer of conventional shoe fabric is placed on top of an EVA insole, the energy return of the shoe component decreases (Comparative Example 2).

In contrast, in one embodiment of the present invention of a foam 1,4-polybutadiene/rubber composition, comprising about 60 weight percent 1,4-polybutadiene (about 90% cis content) and about 40 weight percent natural rubber, the foam composition provides about 47% energy return (Example 3). In another embodiment of the present invention, a substantially solid 1,4-polybutadiene/rubber composition, comprising about 60 weight percent 1,4-polybutadiene (about 90% cis content) and about 40 weight percent natural rubber, provides increased energy return of about 67% (Example 4). Example 5 shows that the combination of a substantially solid 1,4-polybutadiene/rubber composition with conventional shoe materials, such as standard shoe fabric, is within the scope of the invention. Although the shoe fabric can act to somewhat reduce the energy return (compare Examples 4 and 5), substantial energy return is still conferred by this embodiment of the invention.

Example 6 shows that the energy return of the foam 1,4-polybutadiene/rubber composition of Example 3 can be increased from about 47% to about 53% by adding a thin coating of hard polyurethane to the top or bottom of the 1,4-polybutadiene/rubber composition. Example 7 shows the best mode of the invention of a substantially solid 1,4-polybutadiene/rubber composition comprising about 60 weight percent high-cis 1,4-polybutadiene and about 40 weight percent natural rubber. This embodiment of the invention yields increased energy return of 74%.

Enhancement of Athletic Performance

Experimentation width various configurations and embodiments of the present invention has produced evidence establishing that an improvement in energy return, and athletic performance, is experienced by athletes using the 1,4-polybutadiene/rubber composition. More specifically, the length of stride on the first stride and successive strides in running, the jumping ability of a basketball player, and any combination of vertical and horizontal self-displacement by the user are enhanced. Several different measures of athletic performance were used to quantitate the improvement in athletic performance by shoe components comprising the 1,4-polybutadiene/rubber composition.

Study I. Double Blind Speed Study

In a double-blind speed study, thirty-one (31) athletes were speed tested for distances of 10, 20, 30 or 40 meters (M). A moleskin placebo or a substantially solid 1,4-polybutadiene/rubber pad (5/64" thick) was placed under the ball of the foot beneath the insole of the athlete's track spikes or running flats. The participating athletes were not informed that either the placebo or the pad could increase athletic performance. The 1,4-polybutadiene/rubber composition comprised about 60 weight percent 1,4-polybutadiene (about 90% cis content) and about 40 weight percent natural rubber. The athletes were members of either university track, baseball and football teams or national track and soccer teams. For each athlete, one to four time trials were conducted over a one or two day period. The athletes were tested on both outdoor and rubberized tracks. The speed improvements of the athletes, as measured in seconds, are shown in Table 3.

Example 1 shows the speed improvements of athletes for a distance of 40 meters while wearing running spikes. From a standing start, the athletes' times were measured at 10 and 40 meters. The time difference between 10 and 40 meters was used to compute the time the athletes took to traverse the intermediate 30 meters. As shown in Example 1, when the athletes wore running spikes containing a pad according to the invention, their average improvement was about 1.57–1.59%, and the speed improvement was nearly constant throughout the 40 meter distance.

Example 2 shows speed improvements of athletes for a distance of 20 meters while wearing running flats. From a standing start, the athletes' times were measured at 10 and 20 meters. The time difference between 10 and 20 meters was used to compute the time the athletes took to traverse the second 10 meters. As shown in Example 2, the average speed improvement of the athletes was greater for the second 10 meters as compared with the first 10 meters (0.61% vs 1.58%; compare 2a and 2b). The speed improvement of the athletes was less pronounced during their initial acceleration than once they had reached full stride. The average improvement for the second 10 meters, of about 1.58%, was very similar to the average speed improvement observed in Example 1a–c, and indicates that the speed improvement can be independent of the shoe type.

Example 3 shows the speed improvements of athletes wearing running spikes. From a standing start, the athletes' times were measured for a distance of 20 meters. The observed average speed improvement of 1.36% is very similar to the speed improvements of the athletes in Example 1 and Example 2b.

Of the athletes tested in Examples 1–3, twenty-six (26) ran significantly faster, two (2) ran slower and three (3) ran statistically the same. This study also showed that athletes wearing both track spikes and running flats can experience improved athletic performance.

Study II. Seasonal Performance Testing

A seasonal study of fourteen (14) members of university track teams was conducted to evaluate the performance of athletes with and without a 1,4-polybutadiene/rubber pad. The 1,4-polybutadiene/rubber pad (5/64" thick) comprised 60 weight percent 1,4-polybutadiene (about 90% cis content) and 40 weight percent natural rubber, and was built into the athletes' meet spikes below the ball of the foot under the insole. The athletes were divided into two groups. The average and best performances of these athletes are shown in Tables 4 and 5, respectively.

For Group 1, the average and best athletic performances of eight (8) sprinters (100 to 400 meter runs and intermediate hurdle events) were monitored for a nine week period without the invented pad, and for a three week period with the invented pad, in their meet spikes. Seven (7) of the eight (8) athletes showed improved average and best performances with the present invention in their shoes. The average improvement for this group was 1.49%.

For Group II, the average and best athletic performances of six (6) middle-distance runners (800 and 1500 meters runs) were monitored for a two month period without the pad, or a one month period with the pad, in their meet spikes. All six (6) athletes showed improved average and best performances with the pad in their shoes. The average improvement for the middle-distance runners was 1.48%.

Thus, thirteen of fourteen athletes participating in this study showed an average performance improvement of 1.48–1.49% using the present invention. This performance improvement is very similar to the performance improvement of the athletes shown in the double blind speed study (Study I.) of 1.36–1.59%. In contrast, sixty (60) percent of athletes (50 athletes in 42 of 70 events) in a control group (without the pad) showed no improvement in athletic performance over the same time period.

Study III. Two Leg Double Bound Tests

A two leg double bound test was conducted on 35 members of university volleyball, baseball and track teams. The distances the athletes could jump, from a standing start, in two sequential jumps was measured with and without a pad inserted in the athletes' shoes. The pad comprised 60 weight percent 1,4-polybutadiene (about 90% cis content) and 40 weight percent natural rubber; the pad was inserted in the athletes' shoes below the ball of the foot under the insole. These athletes were able to jump an average of 2½, 2½ and 5 inches farther, respectively, when the invented pad was used. The range of improvements was from −2" to 14", when the invented pad was used.

Study IV. Two Leg Double Bound Tests

A two leg double bound test was also conducted using a pad comprising 60 weight percent high-cis 1,4-polybutadiene and 40 weight percent natural rubber in the form of a pad inserted in the athletes' shoes below the ball of the foot under the insole. Of twelve (12) members of a division 1 university basketball team, all jumped farther with the pad inserted in the shoe. The average improvement in distance was 5.6 inches. The range of improvements was from 1 to 12 inches.

Fourteen (14) members of a high school varsity volleyball team were also tested. All fourteen athletes jumped farther with the pad in their shoe. The average improvement was 8.6 inches, when the invented pad was used. The range of improvements was from 3 ½ to 14 inches, when the invented pad was used.

SUMMARY

In summary, athletes and coaches using the present invention of a 1,4-polybutadiene/rubber composition experienced unexpected increases in athletic performance. Most athletes experienced increased faster running times of up to about 1.6%, and further speed increases are contemplated with regular use of the present invention. Similarly, most athletes were able to jump farther with the present invention than without the invention. Athletes and coaches commented that such a pad would be invaluable to enhance performance, and that they had never used such a performance enhancing shoe component before. They also commented that the present invention would also be expected to reduce or mitigate injuries.

TABLE 1

| | | Shoe Components | |
|---|---|---|---|
| Example | Shoe Component | 1,4-Polybutadiene (weight percent) | Rubber (weight percent) |
| 1 | solid sole | 46% 1,4-polybutadiene | 54% polyisoprene |
| 2 | foam insole | 50% 1,4-polybutadiene | 50% acrylonitrile butadiene |
| 3 | solid midsole | 54% 1,4-polybutadiene (high-cis) | 45% ethylene propylene diene modified rubber |
| 4 | foam insole | 75% 1,4-polybutadiene | 25% synthetic isoprene |
| 5 | solid insole | 65% 1,4-polybutadiene (high-cis) | 35% synthetic isoprene |
| 6 | foam midsole | 95% 1,4-polybutadiene | 5% natural rubber |
| 7 | foam insole | 65% 1,4-polybutadiene (high-cis) | 35% acrylonitrile butadiene |
| 8 | solid insole | 60% 1,4-polybutadiene | 40% natural rubber |
| 9 | solid insole | 60% 1,4-polybutadiene (high-cis) | 40% natural rubber |
| 10 | solid insole | 95% 1,4-polybutadiene | 5% polyisoprene |

TABLE 2

Energy Return

| Example | Composition (Weight Percentage) | Energy Return |
|---|---|---|
| Comparative Example 1 | EVA sponge rubber insole with shoe fabric removed | 12% |
| Comparative Example 2 | EVA sponge rubber insole with shoe fabric on top | 10% |
| 3 | foam 1,4-polybutadiene/rubber composition (60% 1,4-polybutadiene (90% cis), 40% natural rubber with a foaming agent) | 47% |
| 4 | substantially solid 1,4-polybutadiene/rubber composition (60% 1,4-Polybutadiene (90% cis), 40% natural rubber) | 67% |
| 5 | substantially solid 1,4-polybutadiene/rubber composition with shoe fabric on top (60% 1,4-polybutadiene (90% cis), 40%; natural rubber) | 56% |
| 6 | foam 1,4-polybutadiene/rubber composition with 1/16" of polyurethane coating (60% 1,4-polybutadiene (90% cis), 40% natural rubber) | 53% |
| 7 | substantially solid 1,4-polybutadiene/rubber composition (60% 1,4-polybutadiene (95% cis), 40% natural rubber) | 74% |

TABLE 3

Double Blind Speed Study

| Example | Number of Athletes | Shoes | Distance | Average Improvement | Comments |
|---|---|---|---|---|---|
| 1a | 14 | Track Spikes | 10 M | 0.0224 seconds (1.58%) | First 10 M |
| b | 14 | " | 30 M | 0.0505 seconds (1.57%) | Second 30 M |
| c | 14 | " | 40 M | 0.0729 seconds (1.57%) | Total Distance |
| 2a | 14 | Running Flats | 10 M | 0.0108 seconds (0.61%) | First 10 M |
| b | 11 | " | 10 M | 0.0198 seconds (1.58%) | Second 10 M |
| c | 11 | " | 20 M | 0.0275 seconds (0.88%) | Total Distance |
| 3 | 3 | Track Spikes | 20 M | 0.0357 seconds (1.36%) | Total Distance |

TABLE 4

Average Seasonal Improvement

| Example | Event | Average without pad* | Average with pad* | Average Improvement |
|---|---|---|---|---|
| Group 1 | | | | |
| A. | 400 M Run | 48.30 (1) | 47.59 (3) | 0.71 seconds |
| | | 46.81 (5) | 46.03 (2) | 0.78 seconds |
| | | 48.35 (5) | 47.27 (4) | 1.08 seconds |
| B. | 400 M Hurdles | 52.17 (6) | 50.59 (3) | 1.58 seconds |
| C. | 200 M Run | 21.94 (1) | 21.49 (2) | 0.45 seconds |
| | | 20.97 (1) | 20.8 (1) | 0.17 seconds |
| | | 21.60 (1) | 21.38 (2) | 0.22 seconds |
| | | 21.54 (1) | 21.27 (1) | 0.27 seconds |
| D. | 110 M Hurdles | 14.51 (3) | 14.29 (4) | 0.22 seconds |
| | | 14.14 (8) | 13.91 (2) | 0.23 seconds |
| E. | 100 M Run | 10.66 (4) | 10.73 (6) | −0.07 seconds |
| F. | Long Jump | 22'10" (5) | 23'4" (5) | 6" farther |
| Group II. | | | | |
| G. | 1500 M Run | 357.56 (4) | 354.15 (2) | 3.41 seconds |
| | | 358.24 (3) | 355.27 (2) | 2.97 seconds |
| | | 357.60 (3) | 355.85 (2) | 1.75 seconds |
| H. | 800 M Run | 154.51 (1) | 153.50 (3) | 1.01 seconds |
| | | 153.40 (3) | 151.93 (4) | 1.47 seconds |
| | | 156.94 (4) | 154.00 (4) | 2.94 seconds |

*The average improvement for all examples except F is given in seconds. The number of trials used to compute the average is shown in parentheses.

TABLE 5

Best Seasonal Improvement

| Example | Event | Average without pad* | Average with pad* | Average Improvement |
|---|---|---|---|---|
| Group 1 | | | | |
| A. | 400 M Run | 48.30 (1) | 47.34 (3) | 0.96 seconds |
| | | 45.82 (5) | 45.96 (2) | −0.14 seconds |
| | | 47.81 (5) | 47.03 (4) | 0.78 seconds |
| B. | 400 M Hurdles | 51.41 (6) | 50.45 (3) | 0.96 seconds |
| C. | 200 M Run | 21.94 (1) | 21.38 (2) | 0.56 seconds |
| | | 20.97 (1) | 20.8 (1) | 0.17 seconds |
| | | 21.60 (1) | 21.31 (2) | 0.29 seconds |
| | | 21.54 (1) | 21.27 (1) | 0.27 seconds |
| D. | 110 M Hurdles | 14.38 (3) | 14.17 (4) | 0.21 seconds |
| | | 13.91 (8) | 13.88 (2) | 0.03 seconds |
| E. | 100 M Run | 10.56 (4) | 10.54 (6) | 0.02 seconds |
| F. | Long Jump | 24'1" (5) | 24'1" (5) | — |
| Group II. | | | | |

TABLE 5-continued

| | | Best Seasonal Improvement | | |
|---|---|---|---|---|
| Example | Event | Average without pad* | Average with pad* | Average Improvement |
| G. | 1500 M Run | 356.33 (4) | 351.93 (2) | 4.41 seconds |
| | | 357.94 (3) | 353.83 (2) | 4.11 seconds |
| | | 356.33 (3) | 351.06 (2) | 5.27 seconds |
| H. | 800 M Run | 154.51 (1) | 152.86 (3) | 1.65 seconds |
| | | 151.93 (3) | 150.60 (4) | 1.33 seconds |
| | | 154.96 (4) | 152.92 (4) | 2.04 seconds |

*The average improvement for all examples except F is given in seconds. The number of trials from which the best performance was selected is shown in parentheses.

While the present invention has been described and illustrated in conjunction with a number of specific embodiments, those skilled in the art will appreciate that variations and modifications may be made without departing from the principles of the invention as herein illustrated, described and claimed.

The invention may be embodied in other specific forms without departing from the spirit or essential characteristics thereof. The present embodiments are to be considered in all respects as illustrative, and not restrictive. The scope of the invention, is therefore, indicated by the appended claims rather than by the foregoing description, and all changes which come within the meaning and range of equivalency of the claims are to be embraced within their scope.

What is claimed and desired to be secured by Letters Patent is:

1. A performance-enhancing shoe component for placement beneath the ball of a human foot, comprising;
   (a) 1,4-polybutadiene, said 1,4-polybutadiene having a cis content of at least about 90%, and
   (b) natural rubber;
   wherein the amount of said 1,4-polybutadiene is within the range of about 50 weight percent to about 75 percent weight, and the amount of said rubber is within the range of about 50 weight percent to about 25 weight percent, said weight percentages being based on the total weight of said 1,4-polybutadiene and said rubber;
   wherein said 1,4-polybutadiene and said rubber are cross-linked to form a cured mix;
   wherein said cure mix is shaped to form a layer for placement within a shoe and beneath the ball of the foot;
   wherein said layer provides at least 47% energy return as a result of the properties of said 1,4-polybutadiene and said rubber in said cured mix; and
   wherein said cured mix is substantially free of fillers and non-energy-returning rubbers which reduce energy return.

2. A shoe component according to claim 1,
   wherein said cured mix is substantially solid and substantially free of trapped gas.

3. A shoe component according to claim 1,
   wherein said cured mix is a foam.

4. A performance-enhancing shoe component for placement beneath the ball of a human foot, comprising:
   (a) high-cis 1,4-polybutadiene within the range of about 50 weight percent to about 75 weight percent, said high-cis 1,4-polybutadiene having a cis content of at least about 95%, and
   (b) natural rubber within the range of about 50 weight percent to about 25 weight percent;
   wherein said weight percentages are based on the total weight of said 1,4-polybutadiene and said rubber;
   wherein said 1,4-polybutadiene and said rubber are cross-linked to form a cured mix;
   wherein said cured mix is shaped to form a layer for placement within a shoe and beneath the ball of the foot;
   wherein said layer provides at least 74% energy return as a result of the properties of said 1,4-polybutadiene and said rubber in said cured mix; and
   wherein said cured mix is substantially free of fillers and non-energy-returning rubbers which reduce energy return.

5. A shoe component according to claim 4,
   wherein said cured mix is substantially solid and substantially free of trapped gas.

6. A shoe component according to claim 4,
   wherein said cured mix is a foam.

7. A performance-enhancing shoe component for placement beneath the ball of a human foot, comprising:
   (a) 1,4-polybutadiene in an amount ranging from about 50 weight percent to about 75 weight percent, said 1,4-polybutadiene having a cis content of at least about 90%;
   (b) natural rubber in an amount ranging from about 50 weight percent to about 25 weight percent; and
   (c) at least on compound selected from the group consisting of curing agents, activating agents and accelerating agents;
   wherein said weight percentages are based on the total weight of said 1,4-polybutadiene and said rubber;
   wherein said 1,4-polybutadiene and said rubber are cross-linked to form a cured mix;
   wherein said cured mix is shaped to form a layer for placement within a shoe and beneath the ball of the foot;
   wherein said layer provides at least 47% energy return as a result of the properties of said 1,4-polybutadiene and said rubber in said cured mix; and
   wherein said cured mix is substantially free of fillers and non-energy-returning rubbers which reduce energy return.

8. A shoe component according to claim 1,
   wherein the amount of said 1,4-polybutadiene is within the range of about 54 weight percent to about 65 percent weight, and the amount of said rubber is within the range of about 46 weight percent to about 35 weight percent.

9. A shoe component according to claim 1, wherein said energy return is at least 53%.
10. A shoe component according to claim 1, wherein said energy return is at least 67%.
11. A shoe component according to claim 1, wherein said 1,4-polybutadiene is high-cis 1,4-polybutadiene, said high-cis polybutadiene having a cis content of at least about 95%.
12. A shoe component according to claim 4, wherein the amount of said 1,4-polybutadiene is within the range of about 54 weight percent to about 65 percent weight, and the amount of said rubber is within the range of about 46 weight: percent to about 35 weight percent.
13. A shoe component according to claim 7, wherein the amount of said 1,4-polybutadiene is within the range of about 54 weight percent to about 65 percent weight, and the amount of said rubber is within the range of about 46 weight: percent to about 35 weight percent.

* * * * *